United States Patent [19]

Ezuka

[11] Patent Number: 5,739,659
[45] Date of Patent: Apr. 14, 1998

[54] POSITION DETECTING APPARATUS AND METHOD THEREFOR

[75] Inventor: Yasuhiro Ezuka, Maebashi, Japan

[73] Assignee: NSK Ltd., Tokyo, Japan

[21] Appl. No.: 743,365

[22] Filed: Nov. 4, 1996

Related U.S. Application Data

[63] Continuation of Ser. No. 455,031, May 31, 1995, abandoned.

[30] Foreign Application Priority Data

Jun. 6, 1994 [JP] Japan ............... 6-123951

[51] Int. Cl.⁶ .................................................. G05B 19/31
[52] U.S. Cl. ......................... 318/605; 318/636; 318/603; 318/608; 318/661
[58] Field of Search ........................... 318/605, 636, 318/638, 600–604, 615–616, 563, 561, 569, 590–594, 606–608, 661, 687

[56] References Cited

U.S. PATENT DOCUMENTS

| | | | |
|---|---|---|---|
| 3,662,242 | 5/1972 | Wacker et al. | 318/595 |
| 3,924,721 | 12/1975 | Reynolds | 318/685 |
| 4,282,468 | 8/1981 | Barker et al. | 318/603 |
| 4,701,839 | 10/1987 | McNally et al. | 318/715 |
| 4,831,510 | 5/1989 | Dummermuth et al. | 318/603 |
| 5,418,439 | 5/1995 | Whang | 318/635 |

FOREIGN PATENT DOCUMENTS

| | | |
|---|---|---|
| 59-148556 | 8/1984 | Japan. |
| 60-73316 | 4/1985 | Japan. |
| 4-3486 | 1/1992 | Japan. |

*Primary Examiner*—David S. Martin
*Attorney, Agent, or Firm*—Shapiro and Shapiro

[57] ABSTRACT

Excitation signals having a phase difference of 120° are generated based on a count of a ring counter and they are supplied to a phase detection type resolver. An output of the resolver is compared with zero level by a comparator to generate uncorrected position data $\theta_F$ which is supplied to a digital delay circuit to delay it in accordance with a position correction value $\Delta\theta$ from a position correction ROM to generate corrected position data $\theta_B$. The corrected position data is supplied to a latch circuit which latches a count of a ring counter and a velocity detection circuit to produce resolver position data $\theta_P$ and velocity data $\Delta T$, which are added and the sum is supplied to the position correction ROM as address data. The velocity data $\Delta T$ is converted to a pulse by a pulse generator and it is accumulated by an accumulation counter to detect a position of a moving part. High precision position detection is attained with reduced velocity ripple even when a rotation velocity of the resolver is high.

4 Claims, 8 Drawing Sheets

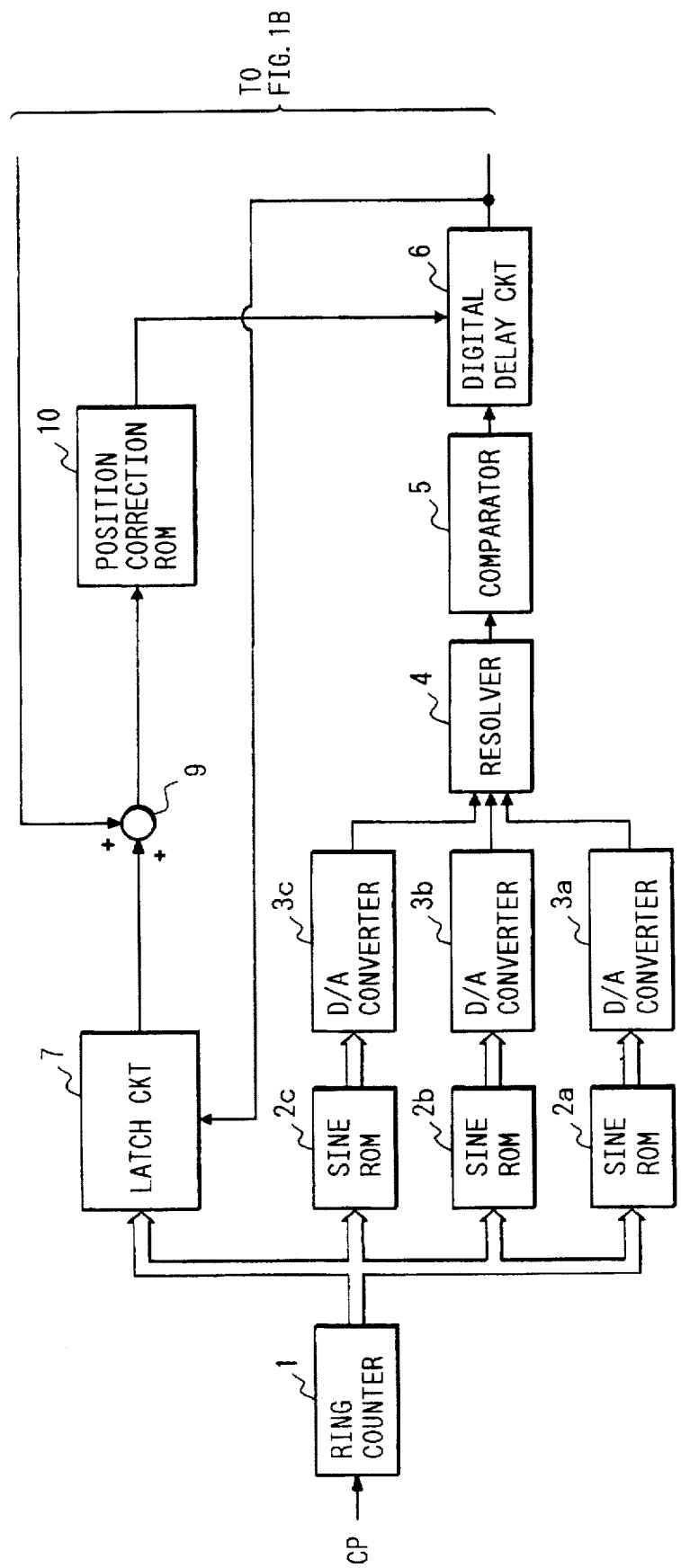

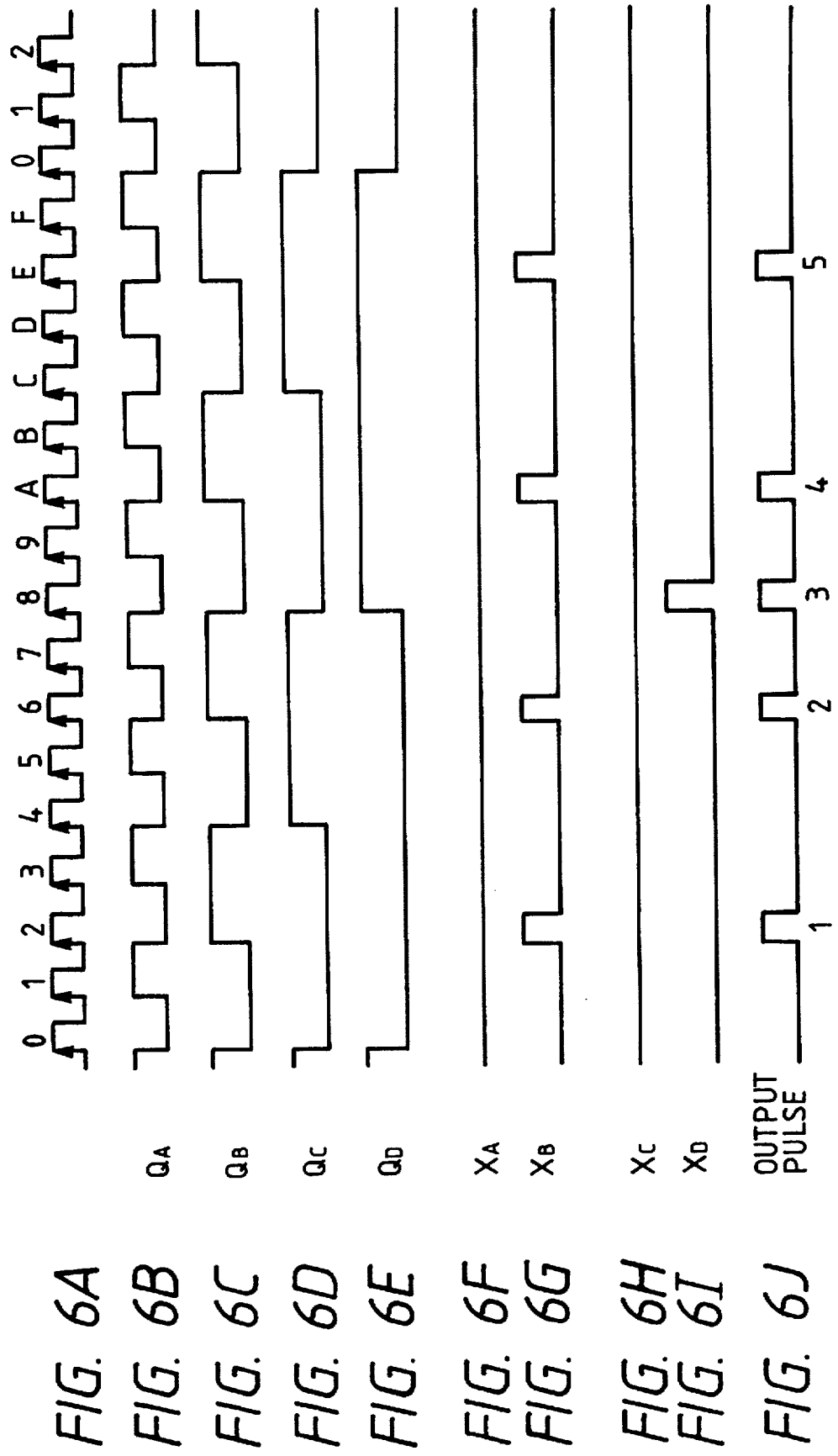

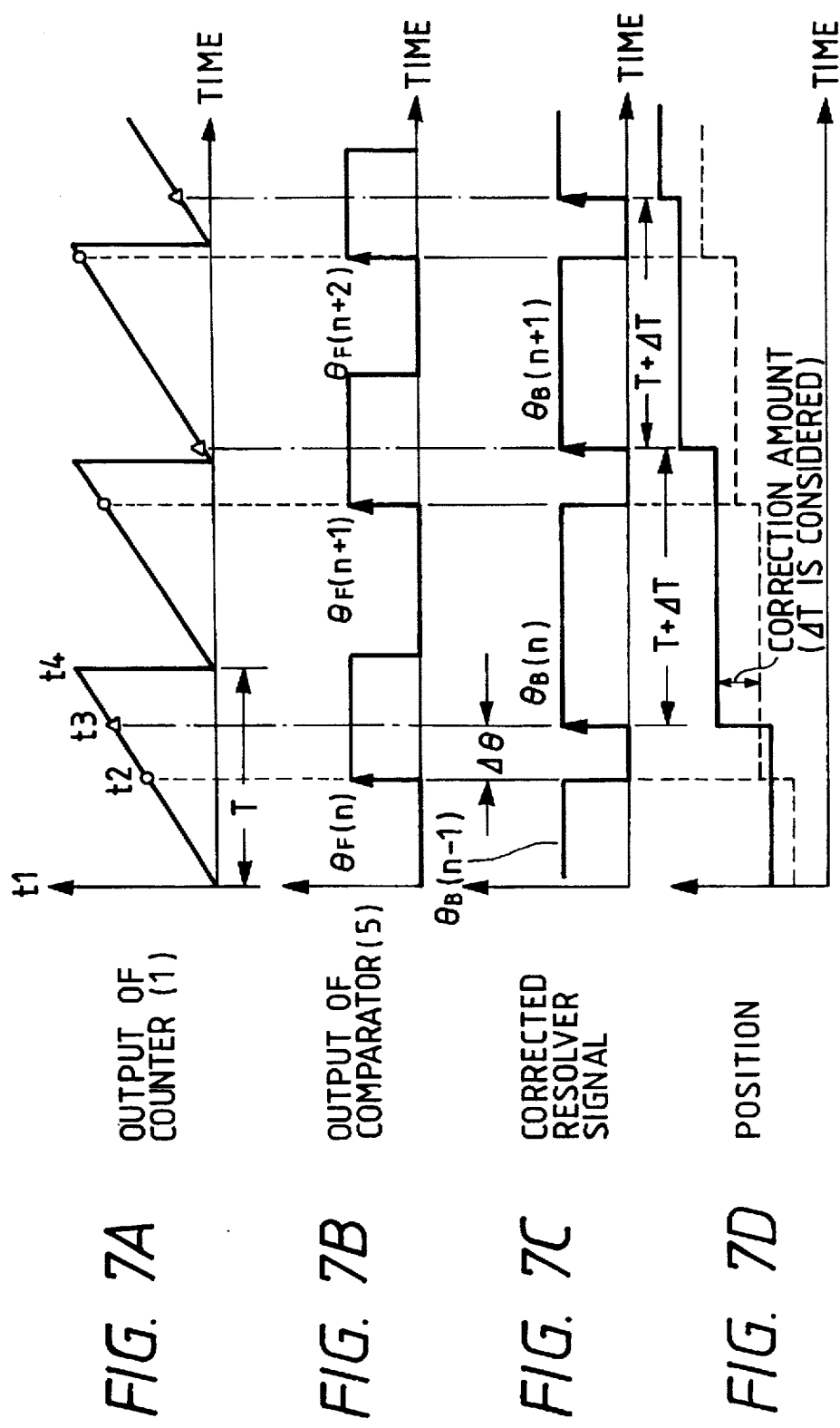

POSITION DETECTING APPARATUS AND METHOD THEREFOR

This is a continuation of application Ser. No. 08/455,031 filed May 31, 1995, now abandoned.

BACKGROUND OF THE INVENTION

1. Field of the Invention

The present invention relates to a position detecting method and a position detecting apparatus for detecting a rotation angle and a rotating velocity of a servo motor and detecting a position and a velocity of a linear motor by using a resolver.

2. Related Background Art

Prior art position detecting methods for detecting a position by using a resolver are disclosed in Japanese Patent Application Laid-Open No. 59-148556 (1984) (hereinafter referred to as the first reference), Japanese Patent Application Laid-Open No. 60-73316 (1985) (hereinafter referred to as the second reference) and Japanese Patent Publication No. 4-3486 (1992) (hereinafter referred to as the third reference).

The first reference discloses a phase error compensating excitation method of an inductor type resolver in which a phase error due to a construction of the inductor type resolver having an excitation winding and a detection winding wound on a stator and having a rotor consisting of only a magnetic material is compensated by an excitation voltage. An amplitude of an excitation voltage vector of the excitation voltage applied to the excitation winding is fixed, and on a phase thereof a phase amount synchronized with the resolver phase error is superimposed to compensate a phase error of the phase modulated detection voltage.

The second reference discloses an error correction circuit for a resolver in which data (correction values) for correcting one $\lambda$ of error of the resolver are stored in a memory, a phase difference between an output wave of a rotor winding of the resolver and a sine wave applied to a stator winding is detected, the memory is addressed by a count of a counter obtained by counting pulses corresponding in number to the phase difference to derive a corresponding correction value, and the count which represents the phase error is corrected by the correction value.

The third reference discloses a phase error compensation apparatus for an inductor type resolver at a detection site which has two-phase excitation windings w$\beta$, w$\alpha$ wound on a stator at positions separated from each other by an electrical angle of 90°, and has two-phase detection winding w$\theta\alpha$, w$\theta\alpha$ wound or the stator at positions separated from each other by an electrical angle of 90°, interposing a gap with a rotor comprising a ferromagnetic material. When $\theta$ is a resolver rotor electrical angle, $\omega=2\pi f$, f is an excitation frequency, t is a time, $\phi(\theta)$ is a phase error for the rotor phase $\theta$ to be detected, $\phi(\omega t)$ is a phase error represented by an excitation rotation electrical angle corresponding to the phase error $\phi(\theta)$, a phase signal sin{$\omega t-\theta-\phi(\theta)$} detected from the detection winding w$\theta\beta$ and a phase signal cos{$\omega t-\theta-\phi(\theta)$} detected from the detection winding w$\theta\alpha$ are applied to a variable phase shifted in which a product of a corrected phase output sin($\omega t-\theta$) of one adder to which a phase signal sin{$\omega t-\theta-\phi(\theta)$} is applied and the phase error $\phi(\omega t)$ is subtracted from a phase signal cos{$\omega t-\theta-\phi(\theta)$}, and a product of corrected phase output cos($\omega t-\theta$) of the other adder to which a phase signal cos{$\omega t-\theta-\phi(\theta)$} is applied and a phase error $\phi(\omega t)$ is added to a phase signal sin{$\omega t-\theta-\phi(\theta)$} for correction to produce corrected phase outputs sin($\omega t-\theta$) and cos($\omega t-\theta$).

However, in the first reference, the excitation voltage (sin$\omega t$, cos$\omega t$) of the oscillation circuit is merely phase-error compensated and velocity information of a moving part such as a servo motor or a linear motor in a section which actually detects the phase is not considered. Thus, as the moving velocity or rotating velocity of the moving part increases, an uncompensated portion remains and a velocity ripple increases so that exact position detection is not attained.

In the second reference, the correction amount is simply added to the detected position data to derive the corrected position data. Again, since the velocity information of the moving part is not considered, the position correction amount becomes inaccurate and the velocity ripple increases as the moving velocity or rotating velocity of the moving part increases, so that the exact position detection is not attained.

In the third reference, the error is corrected by adding the error correction amount $\phi(\omega t)\cdot\sin(\omega t-\theta)$ to the signal detected by the resolver at the detection site such as cos{$\omega t-\theta-\phi(\theta)$}. Again, since the velocity information of the moving part is not considered, the velocity ripple increases as the moving velocity or rotating velocity of the moving part increases, so that the exact position detection is not attained.

SUMMARY OF THE INVENTION

It is an object of the present invention to provide a position detecting method and a position detecting apparatus which minimize a position detection error whenever a moving velocity or a rotating velocity of a moving part changes so that a position detection precision is improved and a ripple of a velocity output is suppressed.

In order to achieve the above object, the position detecting method of the present invention for deriving position information of a moving part (rotator) by sampling, at a predetermined period, a resolver signal outputted from a resolver is characterized by determining current position data of the resolver from data derived by sampling the resolver signal, determining position data and velocity data in a previous period of the resolver, inferring the next sampling position based on the position data and velocity data determined in the previous period of the resolver, determining a position error correction value of the resolver at said inferred position based on pre-stored error correction information for the position, and correcting the current position data by the position error correction value to derive more precise position data.

The position detecting apparatus of the present invention for deriving position information of a moving part by sampling, at a predetermined period, a resolver signal outputted from a resolver is characterized by the provision of position detection means for detecting a resolver position by a timing signal at sampling, velocity detection means for detecting a resolver velocity by the timing signal at sampling, position correction value generating means for generating a position correction value based on the position data of said position detection means and the velocity data of said velocity detection means, correction means for generating the timing signal by delaying the data correction value of said position correction value generation means, and moving part position detection means for detecting the position of the moving part based on the velocity data of said velocity detection means.

In accordance with the present invention, when an error in the current moving part position is to be corrected based on the data sampled from the resolver signal outputted from the resolver by referring to the pre-stored error correction information for the position, the resolver position is detected by the position detection means and also the resolver velocity is detected by the velocity detection means, in the previous sampling, the resolver position in the next sampling is inferred based on the above position data and velocity data, the position error correction value for the inferred position is determined from the pre-stored correction information, and the current position data based on the resolver signal is corrected based on the position error correction value. Thus, the position correction error is suppressed and the velocity ripple is reduced.

Other objects of the present invention will become apparent from the detailed description of the embodiments of the present invention and the accompanying drawings.

BRIEF DESCRIPTION OF THE DRAWINGS

FIGS. 6A to 6J show time charts for illustrating an operation of the pulse converter;

FIGS. 7A to 7D show time charts for illustrating an operation of the embodiment of FIGS. 1A and 1B.

DETAILED DESCRIPTION OF THE PREFERRED EMBODIMENTS

An embodiment of the present invention is now explained in conjunction with the accompanying drawings.

Figure 1B:
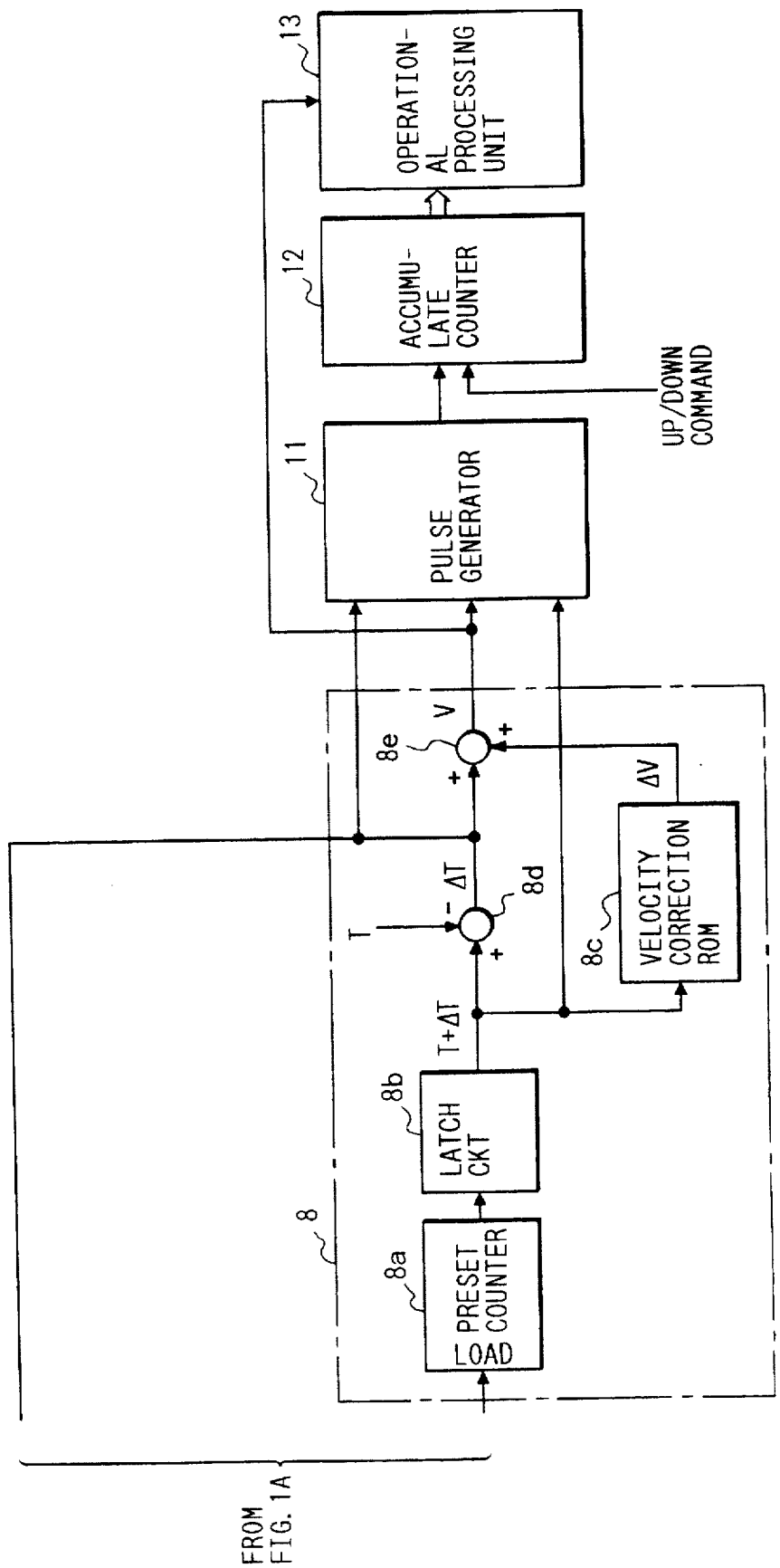
FIG. 1 is comprised of FIGS. 1A and 1B showing block diagrams of one embodiment of the present invention.

FIGS. 1A and 1B show block diagrams of an embodiment of the present invention, in which numeral 1 is, for example, a 12-bit ring counter to which a clock pulse CP of a frequency of, for example, 12 MHz is applied. A count repeated for each period T of the ring counter 1 is supplied to sine ROMs 2a to 2c which produce digital outputs corresponding to sine waves represented by $\sin\omega t$, $\sin(\omega t+2\pi/3)$ and $\sin(\omega t+4\pi/3)$ having a phase difference of 120° therebetween, and they are converted to analog signals by D/A converters 3a to 3c and they are supplied to an excitation winding of a three-phase excitation one-phase output phase detection type resolver 4 as exciting signals. The resolver 4 has a rotor thereof mounted on a rotating shaft of an electric motor, not shown, and is rotated with the rotation of the motor.

When a rotation angle of the rotor of the resolver 4 is represented by $\theta$, a resolver signal represented by $\sin(\omega t \pm \theta)$ is outputted from the resolver 4 and it is supplied to a comparator 5 which serves as current position detection means. The comparator 5 compares the sine wave resolver signal with a zero level to produce a rectangular wave which is on in a positive section and off in a negative section as uncorrected position data $\theta_F$ to a digital delay circuit 6 which serves as correction means.

The digital delay circuit 6 on-delays the uncorrected position data $\theta_F$ supplied from the comparator 5 by a correction amount $\Delta\theta$ read from a position correction ROM 10 to be described later and supplies delayed data which is off-delayed until the next uncorrected position data $\theta_F$ is set to on, as corrected position data $\theta_B$, to a latch circuit 7 which serves as position detection means for latching the count of the ring counter 1 and a velocity detection circuit 8 which serves as velocity detection means.

The latch circuit 7 latches the count of the ring counter 1 at the rise of the corrected position data $\theta_B$ from the digital delay circuit 6 and supplies it to an adder 9 as position data $\theta_P$ in an immediately preceding counter period.

The velocity detection circuit 8 measures period data $(T+\Delta T)$ from the rise of the corrected position data $\theta_B$ to the next rise to determine the velocity. It comprises a preset counter 8a to which a preset value "0" is loaded at the rise of the corrected position data $\theta_B$ and the same clock pulse CP as that supplied to the ring counter 1 is supplied, a latch circuit 8b for latching the count of the preset counter 8a at the rise of the corrected position data $\theta_B$, a velocity compensation ROM 8c for calculating velocity correction data $\Delta V$ representing a detection error of the velocity, based on the latch output representing period data $(T+\Delta T)$ of the corrected position data outputted from the latch circuit 8b, a digital subtractor 8d for subtracting the count period T of the ring counter 1 from the output of latch circuit 8b to produce velocity data $\Delta T$, and a digital adder 8e for adding the difference output $\Delta T$ outputted from the subtractor 8d to the velocity correction data $\Delta V$ outputted from the velocity correction ROM 8c to calculate an actual velocity V. The velocity data $\Delta T$ outputted from the subtractor 8d is supplied to an adder 9, and the actual velocity data V outputted from the digital adder 8e, the velocity data $\Delta T$ outputted from the subtractor 8d and the period data $(T+\Delta T)$ outputted from the latch circuit 8b are supplied to a pulse generator 11 which outputs a position pulse representing the position of the resolver based thereon.

The velocity correction ROM 8c pre-stores a map representing a relation between the actual velocity of the resolver and the period data $(T+\Delta T)$ of the corrected position data. The map is referred to by the period data $(T+\Delta T)$ to calculate the velocity correction data $\Delta V$ representing the detection error of the velocity, which is then outputted to the digital adder 8e. The period data $\Delta T$ may be used as the velocity data because the counter period T is constant without regard to the rotation of the resolver and the count latched in the latch circuit 8b, that is, $\Delta T$ of the period data $(T+\Delta T)$ of the corrected position data $\theta_B$ represents the velocity data. When the resolver stops, $\Delta T=0$, so the period data of the corrected position data $\theta_B$ corresponds to the counter period T.

The adder 9 adds the previous position data $\theta_P$ from the latch circuit 7 to the previous velocity data $\Delta T$ from the velocity detection circuit 8 to produce correcting position data $\theta_A$ and outputs it to a position correction ROM 10 as the address data. Errors for the rotation position of the resolver 4 are previously measured and correction amounts $\Delta\theta$ for correcting the errors of the respective position data, referenced by the position data as the addresses are stored in the position correction ROM 10. Thus, when the correcting position data $\theta_A$ is inputted as the address signal, the correction amount $\Delta\theta$ at the corresponding address is read and it is supplied to the digital delay circuit 6 as beforementioned.

Figure 3:
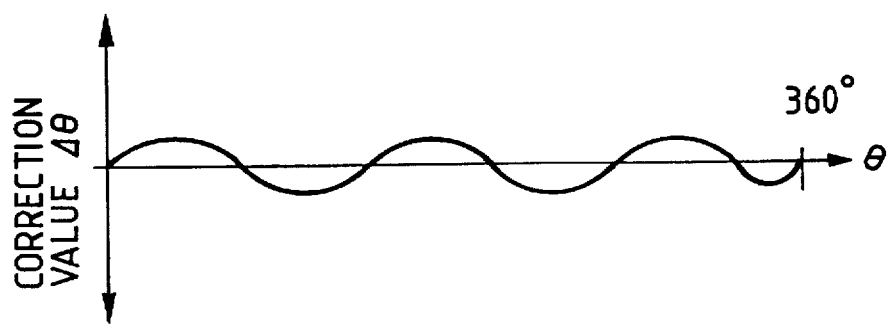
FIG. 3 shows position correction amounts stored in a position correction ROM.

The correction value $\Delta\theta$ changes in sine wave form during one revolution or 360° rotation of the resolver 4 as shown in FIG. 3, and the correction amounts $\Delta\theta$ at respective angular positions are digitized and stored in the position correction ROM 10. The adder 9 and the position correction ROM 10 form position correction value generating means.

Figure 4:
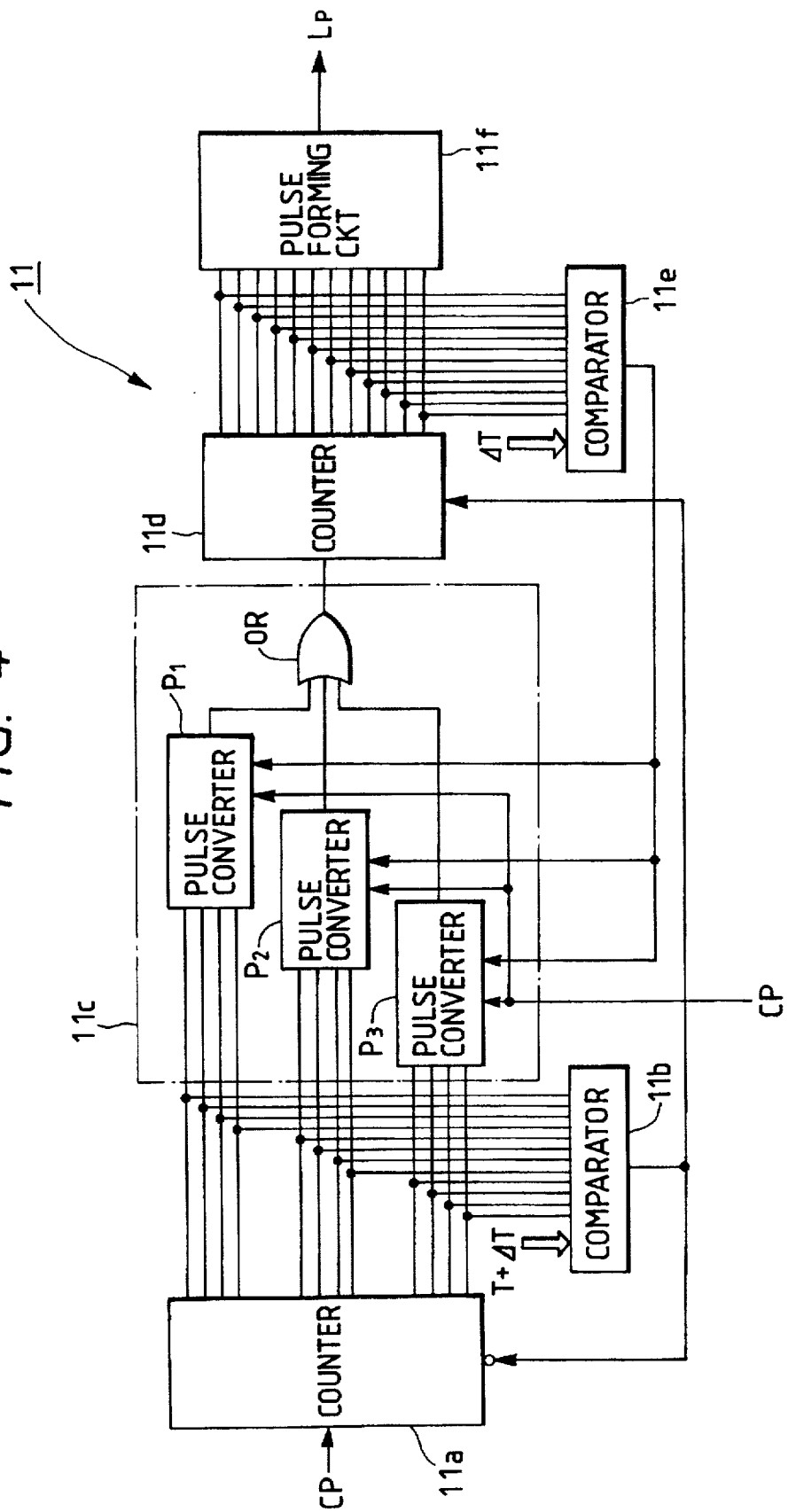
FIG. 4 shows a block diagram of a pulse generator.

The pulse generator 11 has a rate multiplier as shown in FIG. 4 which comprises a 12-bit 3-digit hexadecimal counter 11a to which the same clock pulse CP as that supplied to the ring counter 1 is supplied, a digital comparator 11b for comparing the count A of the counter 11a with the period data (T+ΔT) and outputting a clear signal when they match, a pulse generating circuit 11c for outputting a pulse of the velocity data ΔT during the period data (T+ΔT) based on the output pulse of the counter 11a and the velocity data V, a 3-digit hexadecimal counter 11d for counting the pulse signal outputted from the pulse generating circuit 11c and having the count thereof cleared by the clear signal from the comparator 11b, a digital comparator 11e comparing the count B of the hexadecimal counter 11d with the velocity data ΔT and outputting an enable signal to the pulse generating circuit 11c when they match, and a pulse generating circuit 11f having the same configuration as that of the pulse generating circuit 11c for converting the 12-bit output of the hexadecimal counter 11d to a pulse with the actual velocity data being set to all ones.

The pulse generating circuit 11c comprises pulse converters $P_1$ to $P_3$ for converting the 12-bit 3-digit output of the hexadecimal counter 11a digit by digit and an OR gate receiving the outputs of the pulse converters $P_1$ to $P_3$ as inputs.

Figure 5:
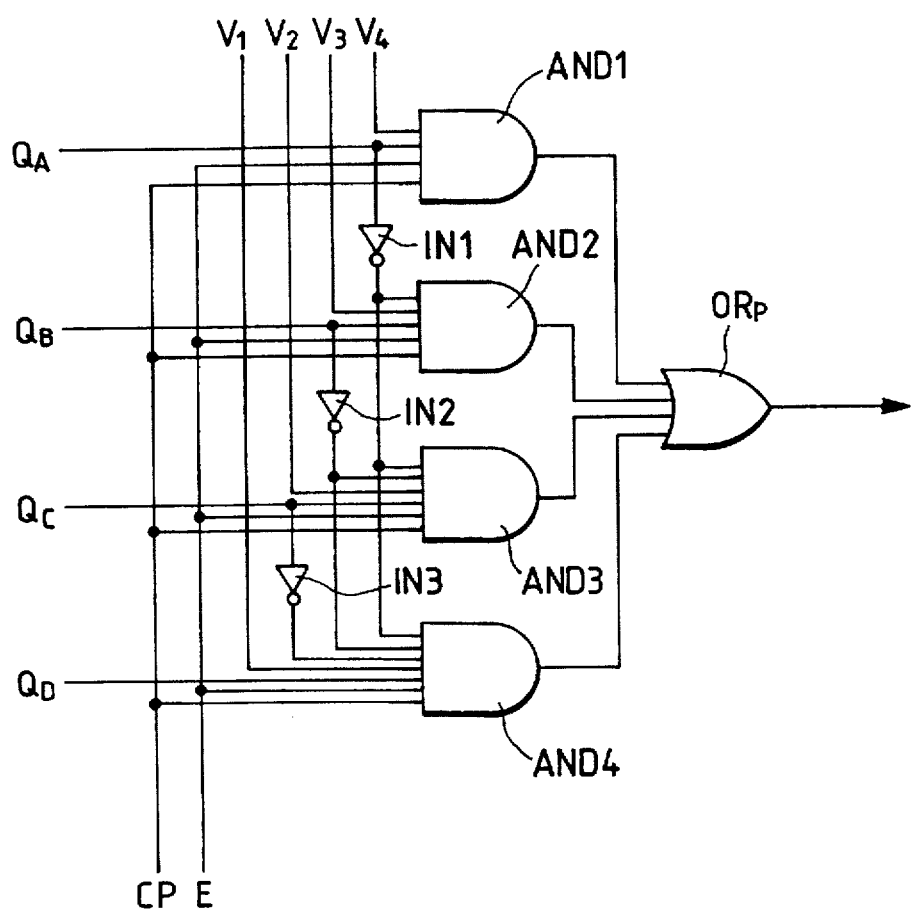
FIG. 5 shows a block diagram of a pulse converter of the pulse generator.

As shown in FIG. 5, each of the pulse converters $P_1$ to $P_3$ comprises an AND gate AND1 to which a least significant bit output $Q_A$ of the one digit of 4-bit output of the hexadecimal counter 11a is applied, an AND gate AND2 to which a higher position bit output $Q_B$ is applied, an AND gate AND3 to which a higher position bit output $Q_C$ is applied, an AND gate AND4 to which a most significant bit output $Q_D$ is applied, an OR gate $OR_P$ to which the output pulses $X_A$ to $X_D$ of the AND gates AND1 to AND4 are supplied, an inverter IN1 for inverting the least significant bit output $Q_A$ of the counter 11a and supplying it to the AND gates AND2 to AND4, an inverter IN2 for inverting an output $Q_B$ of the second from the least significant bit of the counter 11a and supplying it to the AND gates AND3 and AND4, and an inverter IN3 for inverting an output $Q_C$ of the third from the least significant bit of the counter 11a and supplying it to the AND gate AND4. The same clock pulse CP as that supplied to the ring counter 1 is supplied to the AND gates AND1 to AND4 and the enable signal from the comparator 11e is supplied, and the 4-bit hexadecimal data representing the actual velocity data are supplied in the opposite sequence to that of the bit outputs of the counter 11a, that is, the most significant bit output $V_4$ to the AND gate AND1, the second bit output $V_3$ to the AND gate AND2, the third bit output $V_2$ to the AND gate AND3 and the least significant bit output $V_1$ to the AND gate AND4.

Accordingly, assuming that the least significant digit of the actual velocity data V in the least significant digit pulse converter $P_1$ is $V_1$=1, $V_2$=0, $V_3$=1, $V_4$=0 representing decimal "5", when the clock pulse CP is supplied to the hexadecimal counter 11a as shown in FIG. 6A, the bit outputs $Q_A$ to $Q_D$ have clock periods thereof multiplied as shown in FIGS. 6B to 6E, and the AND gates AND2 and AND4 corresponding to the bits of the actual velocity data V which are set to "1" output the output pulses $X_B$ and $X_D$ corresponding to the clock pulse CP when only the bit outputs $Q_B$ and $Q_D$ are on as shown in FIGS. 6G and 6I, and the output pulses $X_B$ and $X_D$ are supplied to an OR gate $OR_P$. As a result, as shown in FIG. 6J, five pulses designated for the attitude by the actual velocity data V during the input of 16 clock pulses CP are substantially equalized.

Turning back to FIGS. 1A and 1B, the position pulse corresponding to the velocity data ΔT outputted from the pulse generating circuit 11f of the pulse generator 11 is applied to an accumulation counter 12 and accumulated thereby. A rotation direction signal indicating a rotation direction of the resolver 4 is supplied to the accumulation counter 12 as an up/down signal.

Accordingly, the accumulated count of the accumulation counter 12 represents the position data of the resolver 4 and the pulse generator 11 and the accumulation counter 12 form moving part position detecting means.

The accumulated count of the accumulation counter 12 supplied to an operation unit 13 for controlling a drive motor for driving a shaft on which the resolver 4 is mounted, as position data θ of the moving part. In addition to the position data θ, the actual velocity data V outputted from the velocity detection circuit 8 is supplied to the operation unit 13 which feedback controls based on the position data θ and the actual velocity data V to control the position and the velocity.

An operation of the embodiment is now explained. It is assumed that the electric motor on which the resolver 4 is mounted is rotated.

The ring counter 1 sequentially counts the input clock pulse signals CP. The count is "0" at a time $t_1$ as shown in FIG. 7A, and it is counted up as the clock pulse signal CP is supplied and when it reaches a maximum count "4095" at a time $t_4$, it is reset to "0" in every counter period T.

As a result, the sine ROMs 2a to 2c output digital values corresponding to sine waves having the phase difference of 120° and they are supplied to the D/A converters 3a to 3c and converted to analog sine wave currents, which are supplied to the resolver 4 as the excitation signal.

In response thereto, the resolver 4 outputs the resolver signal of a sine wave. Since the rotary shaft is now rotated, the resolver signal represented by sin(ωt+θ) whose rotation angle is advanced by θ with respect to the excitation signal represented by sinωt is outputted and it is supplied to the comparator 5 which compares it with the zero level so that the comparator 5 supplies to the digital delay circuit 6 the uncorrected resolver signal $θ_F$ which is the rectangular signal which is on in the positive section of the resolver signal at a time $t_2$ as shown in FIG. 7B.

Figures 8A, 8B, 8C:
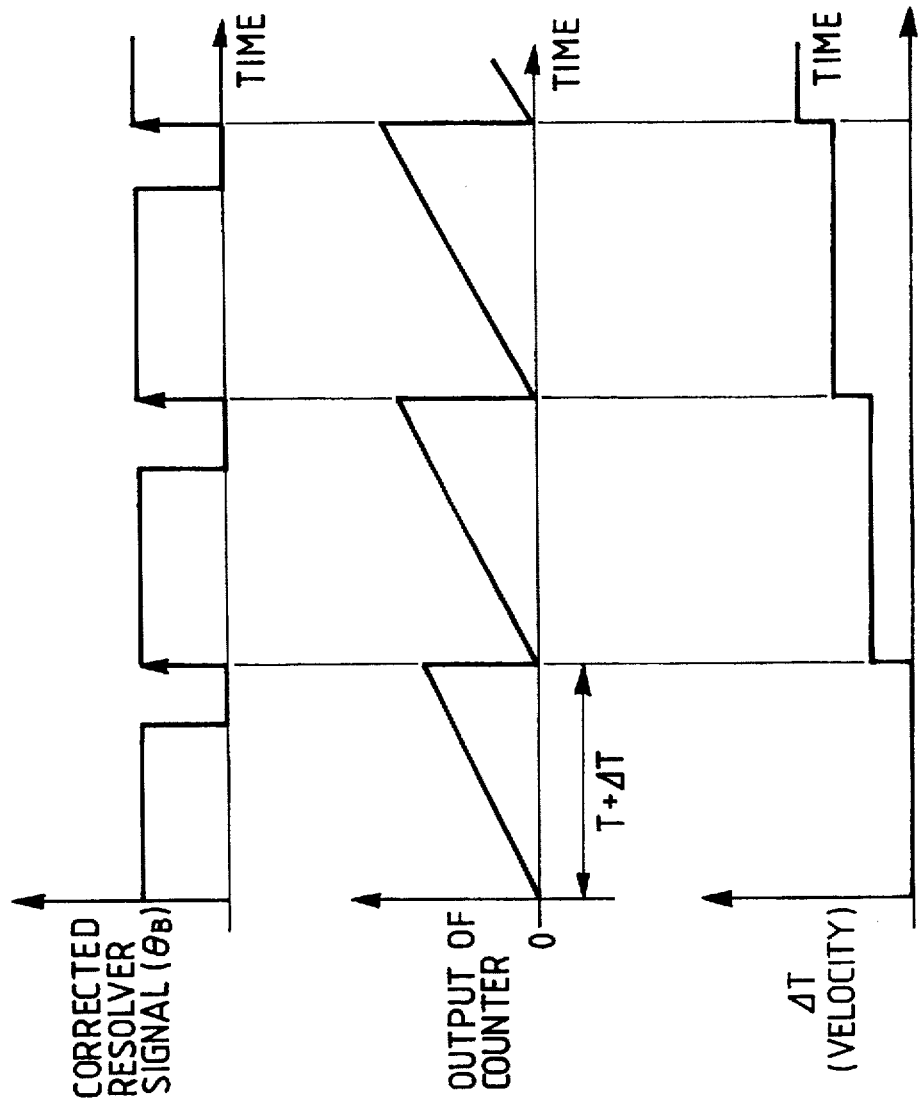
FIGS. 8A to 8C show time charts for illustrating an operation of a velocity detection circuit.

In the previous counter period, the count of the ring counter 1 is latched as the previous position data $θ_{P(in-1)}$ by the latch circuit 7 at the rise of the corrected resolver signal $θ_B$ outputted from the digital delay circuit 6. At the rise of the corrected resolver signal $θ_B$ outputted from the digital delay circuit 6 as shown in FIG. 8A, the count of the preset counter 8a of the velocity detection circuit 8 shown in FIG. 8B is latched and then "0" is loaded to the preset counter 8a and the latched output of the latch circuit 8b, that is, the period data (T+ΔT$_{(n-1)}$) is supplied to the subtractor 8d so that the counter period T of the ring counter 1 is subtracted from the period data (T+ΔT$_{(n-1)}$) to produce the velocity data ΔT$_{(n-1)}$ representing the velocity as shown in FIG. 8C. The position data $θ_{P(n-1)}$ and the velocity data ΔT$_{(n-1)}$ are added by the adder 9 to calculate the position correction data $θ_{A(n-1)}$ which is supplied to the position correction ROM 10 as the address data. Thus, the correction value Δθ which predicts the present position data $θ_{P(n)}$ is outputted from the position correction ROM 10 and it is supplied to the digital delay circuit 6. Thus, the corrected position data $θ_{B(n)}$ is outputted from the delay circuit 6 at a time $t_3$ delayed by correction value Δθ relative to the uncorrected position data $θ_F$ as shown in FIG. 7C.

The corrected position data $θ_{B(n)}$ is supplied to the latch circuit 7 as is the previous counter period T$_{(n-1)}$ and the count of the ring counter 1 is latched as the current position data $\theta_{P(n)}$ and it is supplied to the velocity detection circuit 8 to produce the velocity data $\Delta T_{(n)}$. The sum of the current position data $\theta_{P(n)}$ and the velocity data $\Delta T_{(n)}$ is supplied to the position correction ROM 10 as the next position correction data $\theta_{A(n)}$ and the correction value $\Delta\theta(n)$ for the uncorrected position data $\theta_{F(n+1)}$ in the next counter period is supplied from the position correction ROM 10 to the digital delay circuit 6.

Figure 2:
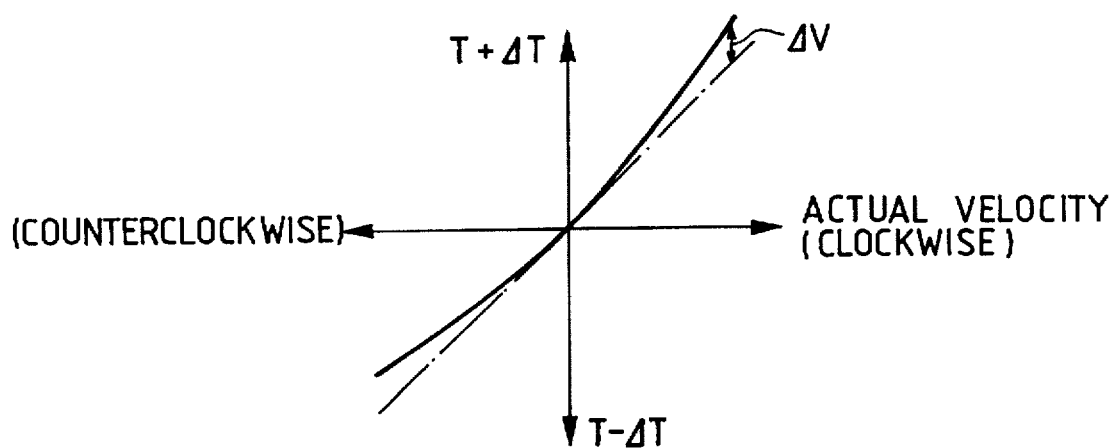
FIG. 2 shows a map of velocity correction amounts stored in a velocity correction ROM.

The velocity detection circuit 8 refers to the map of FIG. 2 in the velocity correction circuit 8c on the basis of the period data (T+$\Delta T_{(n-1)}$ latched in the latch circuit 8b to calculate the velocity correction value $\Delta V_{(n)}$ which is supplied to the adder 8e, which in turn outputs the actual velocity data $V_{(n)}$. The actual velocity data $V_{(n)}$, the period data (T+$\Delta T_{(n-1)}$) and the velocity data $\Delta T_{(n)}$ are supplied to the pulse generator 11.

Thus, assuming that in the pulse generator 11, the period data (T+$\Delta T_{(n-1)}$) is, for example, "3641", the velocity data $\Delta T_{(n-1)}$ is, for example, "455", and the actual velocity data $V_{(n)}$ is, for example, "512", the hexadecimal counter 11a is cleared when the count A reaches 3641. Thus, it is always cleared in accordance with the current period data (T+$\Delta T_{(n-1)}$) and the hexadecimal counter 11d is also cleared simultaneously therewith.

In the pulse generating circuit 11c, since the actual velocity data $V_{(n)}$ is set to "512" which is "200" in decimal notation or 0010 0000 0000 in bit representation. Assuming that the weights of the bit positions are "1", "2", "4", . . . , "1024", "2048" starting from the most significant bit, the number $N_P$ of pulses outputted at the respective bit positions during the counting of the pulses (=3641) corresponding to the period data (T+$\Delta T_{(n-1)}$) is calculated by the following formula (1), and in the pulse converters $P_1$ to $P_3$ of the pulse generating circuit 11c, the pulse is outputted at the bit position at which the actual velocity data $V_{(n)}$ is set to "1". Thus, the position pulse $L_P$ outputted from the pulse generation circuit 11c is "455" which is equal to the velocity data $\Delta T_{(n-1)}$ and the position pulse $L_P$ uniformly corresponding to the velocity data $\Delta T_{(n-1)}$ among the period data (T+$\Delta T_{(n-1)}$) is outputted.

$$N_P=[\{(T+\Delta T_{(n-1)})\text{-bit weight}\}/\text{bit weight}\times 2]+1 \quad (1)$$

By way of example, when the velocity data $\Delta T_{(n-1)}$ per se is set to the pulse generating circuit 11c as the actual velocity data V, $\Delta T_{(n-1)}$=455, which is "1C7" in the hexadecimal notation and 0001 1100 0111 in the bit representation. Thus, the number of pulses outputted at the "1" bit positions are "228", "114", "57", "4", "2" and "1" from the high position and 406 in total. It is shorter than the velocity data $\Delta T_{(n-1)}$ to be outputted (=455) by 49 pulses, which result in a position detection error.

The position pulse signal $L_P$ of pulses (which represent amount of movement between period data) corresponding to the velocity data $\Delta T_{(n)}$ accommodated in the period data (T+$\Delta T_{(n-1)}$) outputted from the pulse generator 11 is supplied to the accumulation counter 12 as the accumulation pulse and accumulated thereby. Thus, the accumulated count represents the data position of the moving part as shown in FIG. 7D and the position data $\theta_{(n)}$ and the velocity data $\Delta T_{(n)}$ of the velocity detection circuit 8 are supplied to the operation unit 13 which executes the predetermined feedback based on the position data $\theta_{(n)}$ and the velocity data $\Delta T_{(n)}$ to control the drive of the drive motor which drives the moving part.

Thereafter, the above operation is repeated and the velocity detection circuit 8 produces the velocity data $\Delta T$ and the accumulation counter 12 produces the position data $\theta$, and the operation unit 13 continues the control of the drive of the drive motor based on the data to advance the moving part to the target position.

When the moving part reached the target position, the operation unit 13 stops the drive of the drive motor so that the rotor of the resolver 4 is stopped. Since the rotation angle is zero, the resolver signal of the resolver 4 is a sine wave signal which is substantially synchronized with the excitation signal represented by sinωt. Thus, the rise time of the corrected position data $\theta_B$ of the digital delay circuit 6 which is outputted immediately after the stop is not changed by the counter period T, so the value latched by the latch circuit 8b of the velocity detection circuit 8 comprises only the counter period T and the velocity data $\Delta T$ outputted from the subtractor 8 is 0. Thus, only the current position data $\theta_P$ latched by the latch circuit 7 is supplied to the position correction ROM 10 as the address data so that the correction value $\Delta\theta$ outputted from the position correction ROM 10 is constant and the corrected position data $\theta_B$ which exactly corresponds to the current stop position is outputted from the digital delay circuit 6. Further, since the velocity data $\Delta T$ of the velocity detection circuit 8 is "0", the position pulse signal $L_P$ is not outputted from the pulse generator 11, the accumulated count of the accumulation counter 12 is not changed and the position data at the stop of the moving part is held.

When the drive motor is reversely driven from the stop condition of the moving part to retract the moving part, the phase of the resolver signal outputted from the resolver 4 is retarded by the rotation angle θ and it is sin(ωt−θ). Accordingly, the velocity data $\Delta T$ outputted from the velocity detection circuit 8 is negative. When it is converted to the position pulse signal $L_P$ by the pulse generator 11, it does not indicate the direction but a count down command is applied to the accumulation counter 12 by the reverse drive so that the accumulated count of the accumulation counter 12 is decremented to produce the position data θ which corresponds to the retraction of the moving part.

In accordance with the present embodiment, the sum of the current position address $\theta_P$ in the previous counter period and the velocity data $\Delta T$ in the previous counter period is supplied to the position correction ROM 10 as the address data to calculate the current position correction value $\Delta\theta$ and the uncorrected position data $\theta_F$ is delayed by the digital delay circuit 6. Accordingly, the current rotation position can be exactly predicted based on the data in one previous counter period. Thus, the position error is reduced and the velocity ripple is suppressed even when the rotating velocity of the rotor of the resolver 4 is high.

By way of example, when the correction by the velocity data $\Delta T$ is not conducted, the correction amount is reduced as shown by a broken line in FIG. 7D and the exact position correction is not attained as the rotating velocity of the rotor of the resolver 4 increases, and the velocity ripple increases.

In the present embodiment, electronic circuits are assembled although the present invention is not limited thereto and the logic and arithmetic operations may be performed by an operation unit such as a microcomputer.

In the present embodiment, the ring counter 1 is of 12-bit configuration although the present invention is not limited thereto and it may be 13 bits or more to enhance the resolution. The sampling period may be shortened by increasing the frequency of the clock pulse.

In accordance with the position detecting method and the position detecting apparatus of the present invention, the current position is predicted based on the position data and the velocity data of one previous counter period, and the position data based on the resolver signal outputted from the resolver is corrected based on the position correction value corresponding to the predicted position. Accordingly, the velocity ripple is reduced without regard to the rotation velocity of the rotor of the resolver and the high precision position detection is attained. When the position detection signal is used to control the drive of the moving part, the vibration and the noise can be reduced.

What is claimed is:

1. A position detecting method for deriving position information of a moving part by sampling, at a predetermined period, a resolver signal outputted from a resolver, comprising the steps of:

determining current position data of the resolver from data derived by sampling the resolver signal;

determining position data and velocity data of the resolver for a preceding period from data derived by sampling the resolver signal, and holding the determined position data and velocity data;

calculating correcting position data based on the determined position data and velocity data of the resolver for the preceding period;

deriving a position detection error correction value for the current position of the resolver from pre-stored position detection error correction values, based on the calculated correcting position data; and correcting the current position data based on the position detection error correction value.

2. A position detecting apparatus for deriving position information of a moving part by sampling a resolver signal outputted from a resolver, comprising:

timing signal generating means for delaying a signal obtained by sampling the resolver signal to thereby generate a timing signal;

position detection means for detecting position data of the resolver in accordance with the timing signal;

velocity detection means for detecting velocity data of the resolver in accordance with the timing signal;

position detection error correction value generating means for generating a position detection error correction value based on the position data detected by said position detection means and the velocity data detected by said velocity detection means, said position detection error correction value being used to control said timing signal generating means; and moving part position detection means for detecting a position of the moving part in accordance with the velocity data detected by said velocity detection means.

3. A position detecting apparatus for deriving position information of a moving part by sampling, at a predetermined period, a resolver signal outputted from a resolver, comprising:

first determination means for determining current position data of the resolver from data derived by sampling the resolver signal;

second determination means for determining position data and velocity data of the resolver for a preceding period from data derived by sampling the resolver signal, and holding the determined position data and velocity data;

calculation means for calculating correcting position data based on the determined position data and velocity data of the resolver for the receding period;

deriving means for deriving a position detection error correction value for the current position of the resolver from re-stored position detection error correction values, based on the calculated correcting position data; and correction means for correcting the current position data based on the position detection error correction value.

4. A position detecting method for deriving position information of a moving part by sapling a resolver signal outputted from a resolver, comprising the steps of:

delaying a signal obtained by sampling a resolver signal to thereby generate a timing signal;

detecting position data of the resolver in accordance with the timing signal;

detecting velocity data of the resolver in accordance with the timing signal;

generating a position detection error correction value based on the position data detected in said position detection step and the velocity data detected in said velocity detection step, said position detection error correction value being used to control the generation of a subsequent timing signal; and detecting a position of the moving part in accordance with the velocity data detected in said velocity detection step.

* * * * *